Patented Aug. 20, 1940

2,212,026

UNITED STATES PATENT OFFICE 2,212,026

TREATMENT OF HYDROCARBONS

Vasili Komarewsky, Chicago, Ill., assignor to Universal Oil Products Company, Chicago, Ill., a corporation of Delaware No Drawing. Application December 31, 1936, Serial No. 118,683

3 Claims. (Cl. 260—668)

This invention relates particularly to the conversion of straight chain hydrocarbons into closed chain cyclic hydrocarbons.

More specifically it is concerned with a process involving the use of special catalysts and specific conditions of operation in regard to temperature, pressure, and time of reaction whereby aliphatic hydrocarbons can be efficiently converted into aromatic hydrocarbons.

In the straight pyrolysis of pure hydrocarbons or hydrocarbon mixtures such as those encountered in fractions from petroleum or other naturally occurring or synthetically produced hydrocarbon mixtures the reactions involved which produce aromatics from paraffins and olefins are of an exceedingly complicated character and cannot be very readily controlled.

It is generally recognized that, in the thermal decomposition of hydrocarbon compounds or hydrocarbon mixtures of relatively narrow range, whatever intermediate reactions are involved, there is an overall loss of hydrogen, a tendency to carbon separation and a generally wider boiling range in the total liquid products as compared with the original charge. Under mild cracking conditions involving relatively low temperatures and pressures and short times of exposure to cracking conditions it is possible to some extent to control cracking reactions so that they are limited to primary decompositions and there is a minimum loss of hydrogen and a maximum production of low boiling fractions consisting of compounds representing the fragments of the original high molecular weight compounds. Thus as a classic example, it has been shown that n-dodecane may be thermally decomposed under carefully regulated conditions to produce substantial yields of n-hexene and n-hexane, indicating a split at the center of the hydrocarbon chain without any loss of hydrogen.

As the conditions of pyrolysis are increased in severity using higher temperatures and higher times of exposure to pyrolytic conditions, there is a progressive increase in loss of hydrogen and a large amount of secondary reactions involving recombination of primary radicals to form polymers and some cyclization to form naphthenes and aromatics, but the mechanisms involved in these cases are of so complicated a nature that very little positive information as to their exact character has been evolved in spite of the large amount of experimentation which has been done and the large number of theories proposed. In general, however, it may be said that, starting with paraffin hydrocarbons representing the highest degree of saturation, these compounds are changed progressively into olefins, naphthenes, and aromatics, and finally into carbon and hydrogen and other light fixed gases. It is not intended to infer from this statement that any particular success has attended the conversion of any given paraffin or other aliphatic hydrocarbon into an aromatic hydrocarbon of the same number of carbon atoms by way of the progressive steps shown. If this is done it is usually with very low yields which are of no practical significance.

The search for catalysts to specifically control and accelerate desired conversion reactions among hydrocarbons has been attended with the usual difficulties encountered in finding catalysts for other types of reactions since there are no basic laws or rules for predicting the effectiveness of catalytic materials and the art as a whole is in a more or less empirical state. In using many catalysts even in connection with conversion reactions among pure hydrocarbons and particularly in connection with the conversion of the relatively heavy distillates and residua which are available for cracking, there is a general tendency for the decomposition reactions to proceed at a very rapid rate, necessitating the use of extremely short time factors and very accurate control of temperature and pressure to avoid too extensive decomposition. There are further difficulties encountered in maintaining the efficiency of catalysts employed in pyrolysis since there is usually a rapid deposition of carbonaceous materials on their surfaces and in their pores.

The foregoing brief review of the art of hydrocarbon pyrolysis is given to furnish a general background for indicating the improvement in such processes which is embodied in the present invention, which may be applied to the treatment of pure paraffin or olefin hydrocarbons, hydrocarbon mixtures containing substantial percentages of paraffin hydrocarbons such as relatively close cut fractions producible by distilling petroleum, and analogous fractions which contain unsaturated as well as saturated straight chain hydrocarbons, such as fractions resulting from cracking operations upon the heavier fractions of petroleum.

In one specific embodiment the present invention comprises the conversion of aliphatic hydrocarbons including paraffin and olefin hydrocarbons into aromatic hydrocarbons by subjecting them at elevated temperatures of the order of 200–400° C. to contact for times of approximately 10-20 seconds with catalytic materials comprising essentially active reduced nickel supported on and intimately mixed with aluminum oxide.

When using the catalysts and conditions of operation peculiar to the present invention aliphatic or straight chain hydrocarbons having 6 or more carbon atoms in chain arrangement in their structure are specifically dehydrogenated in such a way that the chain of carbon atoms undergoes ring closure with the production in the simplest case of benzene from n-hexane or n-hexene and in the case of higher molecular weight paraffins of various alkyl derivatives of benzene. Under properly controlled conditions of times of contact, temperature and pressure, very high ultimate yields of the order of 75 to 90% of the benzene or aromatic compounds are obtainable which are far in excess of any previously obtained in the art either with or without catalysts. For the sake of illustrating and exemplifying the types of hydrocarbon conversion reactions which are specifically accelerated under the preferred conditions by the present type of catalyst, the following structural equations are introduced.

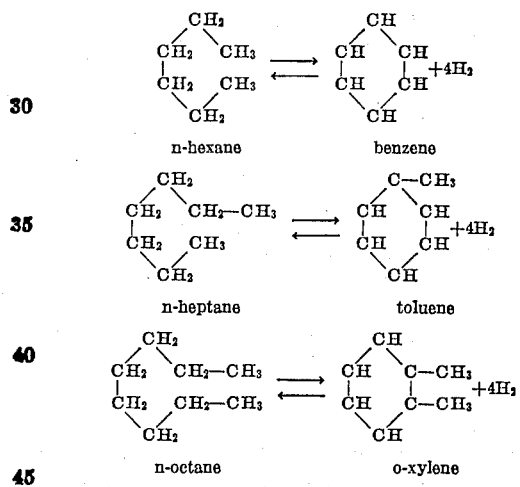

In the foregoing table the structural formulas of the primary paraffin hydrocarbons have been represented as a nearly closed ring instead of by the usual linear arrangement for the sake of indicating the possible mechanisms involved. No attempt has been made to indicate the possible intermediate existence of mono-olefins, diolefins, hexamethylenes or alkylated hexamethylenes which might result from the loss of various amounts of hydrogen. It is not known at the present time whether ring closure occurs at the loss of one hydrogen molecule or whether dehydrogenation of the chain carbons occurs so that the first ring compound formed is an aromatic such as benzene or one of its derivatives. The above three equations are of a relatively simple character indicating generally the type of reactions involved but in the case of n-paraffins or mono-olefins of higher molecular weight than the octane shown and in the case of branched chain compounds which contain various alkyl substituent groups in different positions along the six-carbon atom chain, more complicated reactions will be involved. For example, in the case of such a primary compound as 2,3-dimethyl hexane the principal resultant product is apparently o-xylene although there are concurrently produced definite yields of such compounds as ethyl benzene indicating an isomerization of two substituent methyl groups. In the case of nonanes which are represented by the compound 2,3,4-trimethyl hexane, there is formation not only of mesitylene but also of such compounds as methyl ethyl benzol and various propyl benzols. Owing to the vigorous action of the present type of catalyst and particularly when working with mixtures of aliphatic hydrocarbons so that average conditions of operation must be selected, there may be in some instances a complete loss of the alkyl groups so that for example, the xylene formed from n-octane may be demethylated to form benzene.

It will be seen from the foregoing that the scope of the present invention is preferably limited to the treatment of aliphatic hydrocarbons in straight-chain arrangement. In the case of paraffin hydrocarbons containing less than 6 carbon atoms in linear arrangement, some formation of aromatics may take place due to primary isomerization reactions although obviously the extent of these will vary considerably with the type of compound and the conditions of operation. The process is readily applicable to paraffins from hexane up to dodecane and their corresponding olefins. With increase in molecular weight beyond this point the percentage of undesirable side reactions tends to increase and yields of the desired alkylated aromatics decrease in proportion.

The catalysts which characterize the present invention are prepared in general by the simultaneous precipitation of hydroxides of aluminum and nickel from joint solutions of their salts by the use of alkali metal hydroxides.

For example, an aqueous solution of equimolecular quantities of aluminum and nickel nitrates is treated with a moderately concentrated solution of sodium hydroxide to complete precipitation. The combined hydroxides are filtered and washed until free from the acid radical which point is generally indicated by the incipient peptisation of the mixed hydroxides so that they begin to run through the filter and give a turbid filtrate.

The mixed hydroxides are then transferred to any convenient form of heating apparatus and are heated to a sufficiently high temperature to convert the hydroxides to the corresponding oxides after which the more or less hard cake of oxides is ground and sized to a convenient mesh and the particles are subjected to the action of hydrogen at a temperature of the order of 350° C. to effect the reduction of the nickel oxides to catalytically active nickel, the aluminum oxide not being reducible under these conditions. The resultant catalyst consists therefore essentially of aluminum oxide impregnated with reduced nickel.

It is comprised within the scope of the invention to employ various proportions of nickel and alumina though as a rule the best catalysts are those comprising approximately 20% by weight of reduced nickel. In place of the nitrates mentioned, other soluble salts such as the sulfates or chlorides may be employed in the initial solutions.

By the use of the present types of catalysts conversion of paraffins to aromatics is made possible at much lower temperatures than have heretofore been used with other types of catalysts. In the case of hexanes, heptanes, octanes, and decanes, it is seldom necessary to use temperatures much above 300° C. which is from 100-200° C. lower than the temperatures commonly employed with other types of catalysts. The pressures employed are approximately atmospheric although pressures either side of this point may be employed if desired. When employing subatmospheric pressures, reactions are possibly somewhat more selective although the capacity of any given equipment may be somewhat decreased. When employing superatmospheric pressures, some of the selectivity in the catalytic action may be lost through the throughput and overall capacity may be increased so that the actual pressure employed is somewhat a matter of choice. The time factor may also be varied within considerable limits depending upon the molecular weight of the aliphatic hydrocarbon, its structure and whether it is a paraffin or an olefin. Obviously olefins representing a partially dehydrogenated paraffin hydrocarbon will require correspondingly less time to effect dehydrogenation reactions leading ultimately to the production of aromatics by cyclization. The use of time factors lower than 10 seconds at atmospheric pressure will give increased yields of straight chain olefins corresponding to initial stages of dehydrogenation rather than the later stages involving the reactions or ring closure.

It should be emphasized that in the field of catalysis there have been very few rules evolved which will enable the prediction of what materials will catalyze a given reaction. Most of the catalytic work has been done on a purely empirical basis, even though at times certain groups of elements or compounds have been found to be more or less equivalent in accelerating certain types of reactions.

While the present process is particularly applicable to the production of the corresponding aromatics from an aliphatic hydrocarbon or a mixture of aliphatic hydrocarbons, the invention may also be employed to produce aromatics from aliphatic hydrocarbon mixtures such as distillates from paraffinic or mixed base crude petroleum. In this case the aromatic character of the distillates will have increased and as a rule the octane number will be higher. If desired and found feasible on a basis of concentration, the aromatics produced in the hydrocarbon mixture may be recovered as such by distillation into fractions of proper boiling range followed by chemical treatment with reagents capable of reacting selectively with them. Another method of aromatic concentration will involve the use of selective solvents such as liquid sulfur dioxide, alcohols, furfural, chlorex, etc.

In operating the process the general procedure is to vaporize hydrocarbons or mixtures of hydrocarbons and after heating the vapors to a suitable temperature within the ranges previously specified, to pass them through stationary masses of granular catalytic material in vertical cylindrical treating columns or banks of catalyst-containing tubes in parallel connection. Since the reactions of dehydrogenation and cyclization are endothermic, it may be necessary to apply some heat externally to maintain the best reaction temperature. After passing through the catalytic zone the products are submitted to fractionation to recover cuts or fractions containing the desired aromatic product with the separation of fixed gases, unconverted hydrocarbons and heavier residual materials, which may be disposed of in any suitable manner depending upon their composition. The overall yield of aromatics may be increased by recycling the unconverted straight chain hydrocarbons to further treatment with fresh material, although this is a more or less obvious expedient and not specifically characteristic of the present invention.

The following example is given to indicate the type of results obtainable by the application of the present type of catalytic process although not with the intent of unduly circumscribing the scope of the invention.

A catalyst was prepared by first precipitating the hydroxides of nickel and alumina from a solution of an equimolecular mixture of the nitrates, using sodium hydroxide as the precipitant. After filtering and washing to complete removal of nitrate the hydroxide mixture was calcined to produce a mixture of oxides and these were ground and sized to approximately 10-20 mesh and treated with hydrogen at 350° C. for 20 hours.

Using the above catalyst as filler in a vertical cylindrical treating chamber, vapors of n-octane were passed through the catalyst bed at a temperature of 300° C. at atmospheric pressure with an approximate time of contact of 20 seconds. The liquid recovery was 95% and 20% thereof consisted of p-xylene and ethyl benzene. Continued recycling of unchanged octane brought the final yield of aromatics up to approximately 80%. The gas produced consisted of approximately equal parts of hydrogen and methane.

The nature of the present invention and its practical aspects are evident from the foregoing specification and example although neither section is intended to be unduly limiting upon its proper scope.

I claim as my invention:

1. A process for the conversion of aliphatic hydrocarbons having at least 6 carbon atoms in straight chain arrangement into cyclic hydrocarbons, which comprises subjecting said aliphatic hydrocarbons at elevated temperatures of the order of 200-400° C., substantially atmospheric pressures, and times of approximately 10-20 seconds, to contact with a catalyst comprising essentially a mixture of aluminum oxide and metallic nickel.

2. A process for the conversion of paraffin hydrocarbons having at least 6 carbon atoms in straight chain arrangements into aromatic hydrocarbons, which comprises subjecting said aliphatic hydrocarbons at elevated temperatures of the order of 200-400° C., substantially atmospheric pressures, and times of approximately 10-20 seconds, to contact with a catalyst comprising essentially a mixture of aluminum oxide and metallic nickel.

3. A process for the conversion of mono olefin hydrocarbons having at least 6 carbon atoms in straight chain arrangement into aromatic hydrocarbons, which comprises subjecting said aliphatic hydrocarbons at elevated temperatures of the order of 200-400° C., substantially atmospheric pressures, and times of approximately 10-20 seconds to contact with a catalyst comprising essentially a mixture of aluminum oxide and metallic nickel.

VASILI KOMAREWSKY.